(12) United States Patent
Schaub et al.

(10) Patent No.: US 6,971,800 B2
(45) Date of Patent: Dec. 6, 2005

(54) ROLLERS FOR A ZERO CLEARANCE BEARING

(75) Inventors: Brian D. Schaub, Camillus, NY (US); Michael D. Beaman, Torrington, CT (US)

(73) Assignee: Timken US Corporation, Torrington, CT (US)

( * ) Notice: Subject to any disclaimer, the term of this patent is extended or adjusted under 35 U.S.C. 154(b) by 0 days.

(21) Appl. No.: 10/346,151

(22) Filed: Jan. 16, 2003

(65) Prior Publication Data

US 2004/0141673 A1   Jul. 22, 2004

(51) Int. Cl.[7] ............................................... F16C 33/64
(52) U.S. Cl. ..................................... 384/492; 384/625
(58) Field of Search ................................ 384/492, 625

(56) References Cited

U.S. PATENT DOCUMENTS

| | | | | |
|---|---|---|---|---|
| 4,172,621 A | * | 10/1979 | Yoshida | 384/563 |
| 4,659,241 A | * | 4/1987 | Bamberger et al. | 384/625 |
| 4,770,550 A | * | 9/1988 | Takahashi | 384/495 |
| 5,054,440 A | * | 10/1991 | Kadokawa | 123/90.5 |
| 6,419,397 B1 | * | 7/2002 | Beaman | 384/521 |

OTHER PUBLICATIONS www.sousacorp.com/hardness.htm, Jun. 14, 1999.*
www.bestar.us/tech/hardness/hardness_conversions.htm.*

* cited by examiner

Primary Examiner—Thomas R. Hannon
(74) Attorney, Agent, or Firm—Michael Best & Friedrich LLP

(57) ABSTRACT

A shaft and bearing assembly comprising a soft shaft having an outer contact surface having a hardness less than 30 HRC and a bearing assembly having a plurality of rollers. The bearing assembly is configured to be positioned about the shaft with the rollers in rolling contact with the shaft outer contact surface. The rollers have a roller contact surface having a hardness less than 45 HRC.

20 Claims, 4 Drawing Sheets

ROLLERS FOR A ZERO CLEARANCE BEARING

BACKGROUND

This invention relates generally to bearing assemblies and, more particularly, to a bearing assembly suitable for the mounting of steering columns and similar applications.

In such applications, a bearing assembly includes rollers that contact a shaft, for example a steering column, with zero clearance between the rollers and the shaft. Such a "zero clearance" bearing may be desired in those applications to improve noise and vibration characteristics and maintain a "tight" feel.

Zero clearance bearing assemblies generally include hardened steel rollers. These rollers typically have a surface hardness of at approximately 60–64 Rockwell C (HRC). The generally accepted standard is that a roller must have a surface hardness of at least 58 HRC to be considered "bearing" quality.

In steering applications, steering shafts have typically been manufactured from hardened steel or the like. More recently, to minimize costs and weight, steering shafts have been manufactured from lighter, softer metals, for example, non-hardened steel. While such shafts are generally less expensive, there has been a resultant increase in shaft wear.

SUMMARY

The present invention relates to a shaft and bearing assembly. The assembly comprises a soft shaft having an outer contact surface having a hardness less than 30 HRC and a bearing assembly having a plurality of rollers. The bearing assembly is configured to be positioned about the shaft with the rollers in rolling contact with the shaft outer contact surface. The rollers have a roller contact surface having a hardness less than 45 HRC. It is preferable that the ratio of the roller contact surface hardness to shaft contact surface hardness is less than 4.5 and approaches 1.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
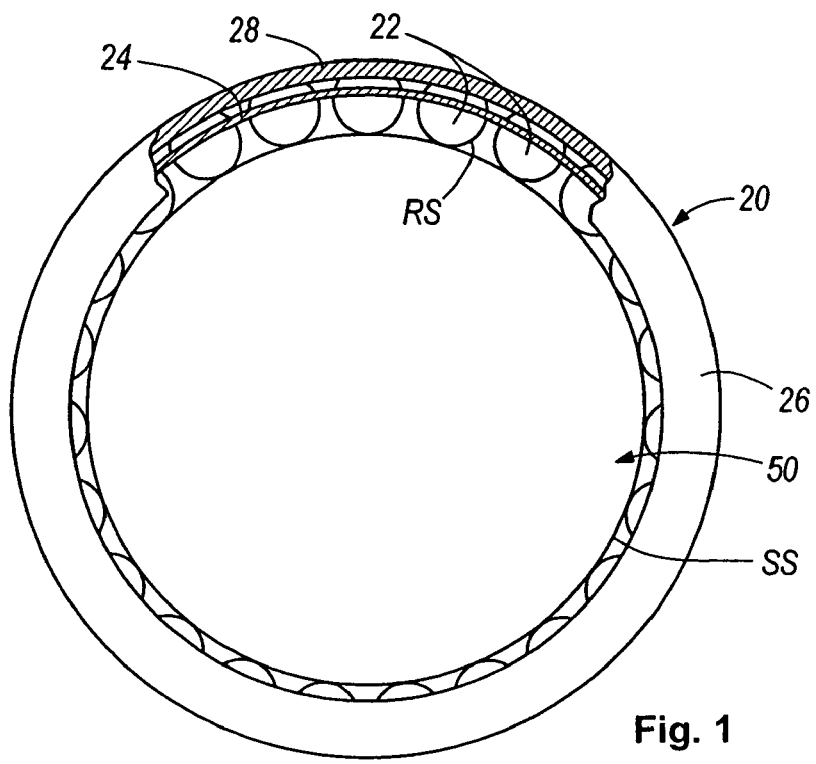
FIG. 1 is a side plan view of a bearing assembly in accordance with the present invention positioned about a shaft, the bearing assembly having a portion of the outer cup removed.
Figure 2:
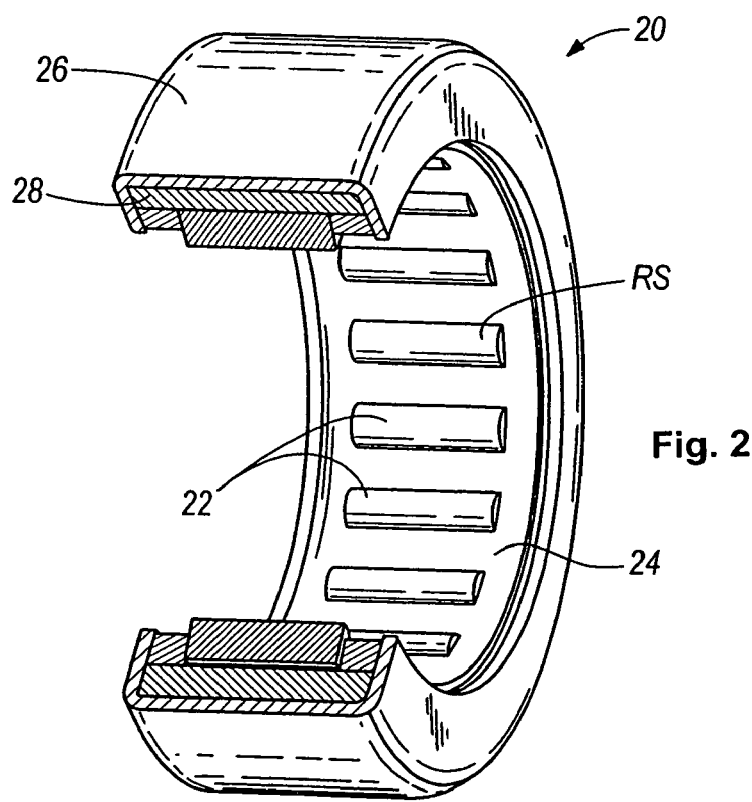
FIG. 2 is an isometric view in partial section of the bearing assembly of FIG. 1.

Referring to FIGS. 1 and 2, a bearing assembly 20 in accordance with the present invention is shown. The bearing assembly 20 preferably comprises an outer race member 26 positioned about a plurality of needle rollers 22 maintained by a roller cage 24. While a cage 24 is preferred, the rollers 22 may be positioned without a cage or may be otherwise retained in a desired configuration. Additionally, while the outer race member 26 is illustrated as a drawn cup member, other configurations are possible, including a split race or positioning of the rollers 22 within various housings. The illustrated embodiment also includes a bushing 28 positioned between the rollers 22 and the outer race member 26. The bushing 28 assists in creating zero clearance between the rollers 22 and the shaft 50 upon which the bearing assembly 20 is positioned. Other configurations, for example, a split race, may also be utilized. As will be understood, the rollers 22 are illustrated in an exemplary bearing assembly 20, however, the particular bearing assembly configuration is not essential to the present invention. The bearing assembly simply provides an arrangement in which the rollers 22 rotate about the shaft 50. The preferred application is for a steering shaft, however, the present invention may be utilized in conjunction with other applications.

Referring to FIG. 1, the rollers 22 have an outer roller contact surface RS that bears against an outer shaft contact surface SS which serves as an inner race for the rollers 22. The shaft 50 is a soft metal shaft, that is, the shaft contact surface SS, and preferably the complete thickness of the shaft 50, has a hardness that is less than or equal to 30 HRC. Such metals may include soft metals, for example copper (approx. 50 Rockwell B (HRB)), brass (approx. 70 HRB) or aluminum (approx. 70 HRB) or may include soft, generally non-hardened or minimally hardened, steels. For example, a preferred shaft 50 may be manufactured from cold rolled, non-hardened steel having a hardness in the range of 85–95 HRB. However, the shaft 50 may have some treatment, for example, coating, plating or nitriding, that may raise the shaft surface SS hardness to the lower HRC scale, for example, a hardness of 25 HRC. These shafts 50 are generally significantly less expensive to manufacture than a hardened steel shaft having a hardness of 55 HRC or more.

To minimize wear on the soft shaft 50, the rollers 22 are provided with a roller contact surface RS having a hardness substantially below that which is generally considered "bearing" quality hardness. For example, referring to FIG. 3, it has been found that rollers 22 having a roller contact surface RS hardness of approximately 45 HRC had a significantly greater performance factor relative to a soft shaft 50 having a hardness of approximately 85–90 HRB compared to the performance factor of a roller having a bearing quality hardness of approximately 60 HRC. The performance factor is defined as the number of revolutions of the shaft divided by the amount of wear on the shaft. As such, the more shaft wear, the lower the performance factor.

Figure 4:
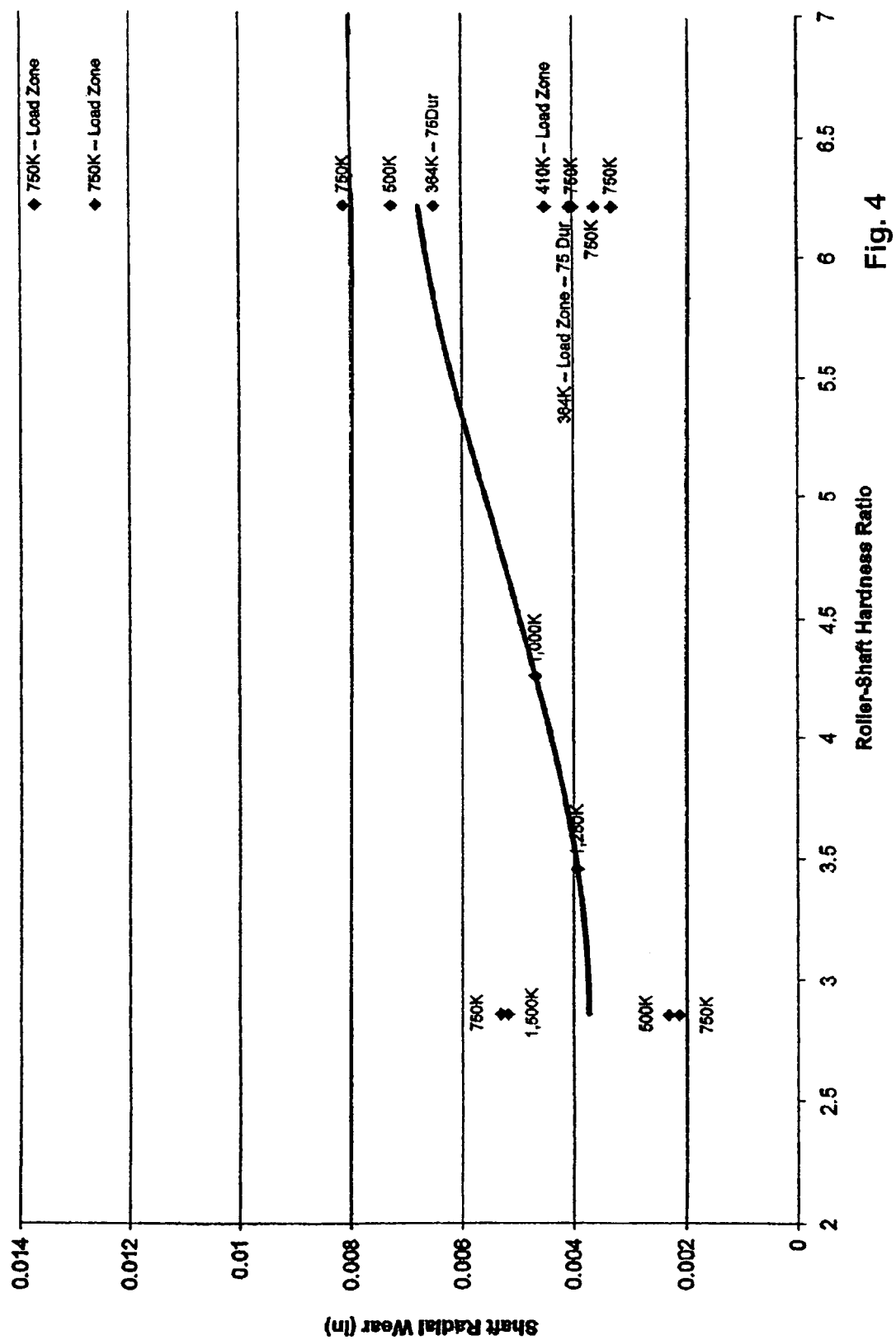
FIG. 4 is graph showing shaft radial wear versus the roller-shaft hardness ratio.
Figure 5:
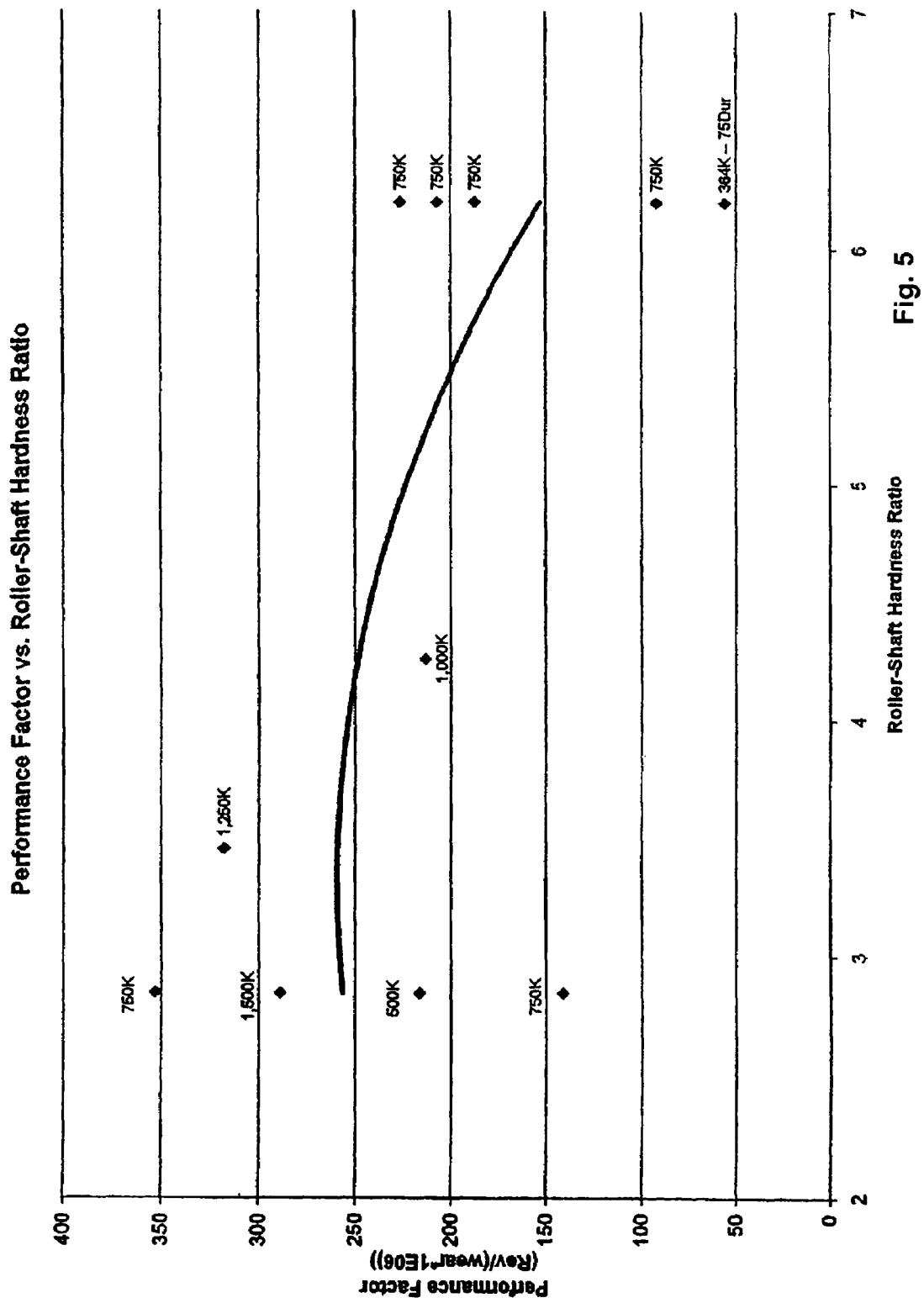
FIG. 5 is a graph showing a performance factor versus the roller-shaft hardness ratio.

Referring to FIGS. 4 and 5, it has further been found that as the roller contact surface RS hardness approaches the hardness of the shaft contact surface SS, the radial wear upon the shaft 50 is further reduced. With respect to the graphs in FIGS. 4 and 5, a shaft 50 having a shaft contact surface SS hardness of approximately 85–90 HRB (which is equal to approximately 10 HRC) was run with various rollers 22 having roller contact surface RS hardnesses between approximately 28 HRC and 60 HRC. As shown in FIG. 4, the amount of shaft radial wear was significantly reduced as the ratio between the roller contact surface RS hardness and the shaft contact surface SS hardness was decreased. The reduction in shaft radial wear is reflected in the increased performance factor as illustrated in the graph of FIG. 5. The tests performed to date indicate that the performance factor will continue to increase as the ratio of roller contact surface RS hardness to shaft contact surface SS hardness approaches 1. It is further believed that significant wear performance will be achieved even with a roller contact surface RS hardness to shaft contact surface SS hardness ratio less than 1.

Figure 3:
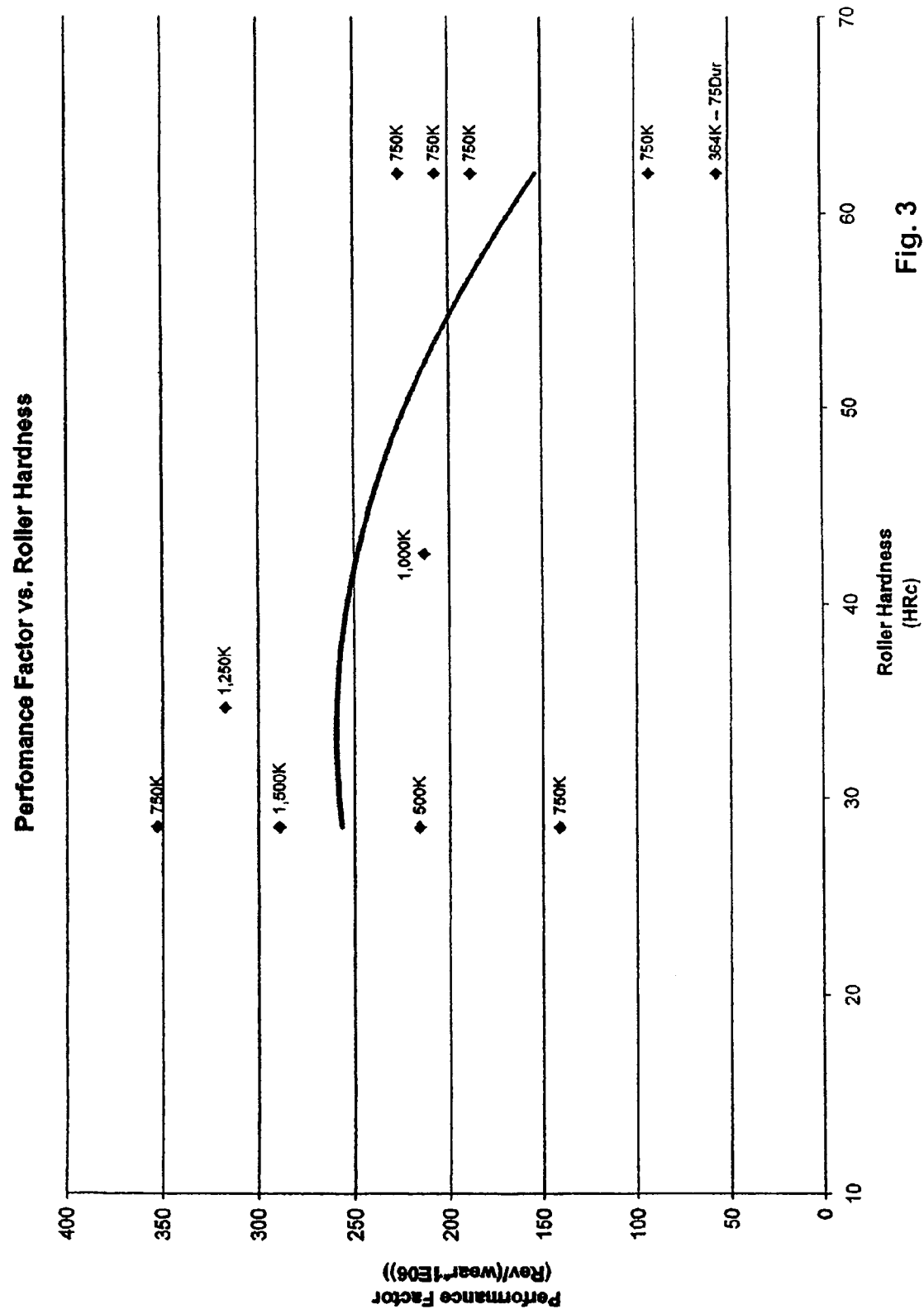
FIG. 3 is a graph showing a performance factor versus the roller hardness.

The test conditions for each of the roller tests plotted on the graphs of FIGS. 3–5 was a bearing load of 100 lbs/bearing; shaft turning speed of 120 rpm; 039 Shell Alvania III grease; shaft contact surface SS hardness of 85–90 HRB; outer race split location 180° from load zone; and a bushing durometer of 60=/−5.

The rollers 22 may be formed from a softened metal, for example, a non-hardened steel. Alternatively, bearing quality rollers, having a hardness of approximately 60 HRC, may be treated, for example, by tempering, to reduce the roller contact surface RS hardness to less than 45 HRC or a hardness closer to the shaft contact surface SS hardness.

While it is preferred that each of the rollers 22 has a soft roller contact surface RS, it is also within the scope of the invention that less than all of the rollers 22 will have a soft roller contact surface RS. For example, the bearing assembly 20 may include both load bearing and non-load bearing rollers. In such an application, it will be sufficient that only the load bearing rollers have a soft roller contact surface RS.

What is claimed is:

1. A steering column comprising:
   a shaft including an outer contact surface, the outer contact surface having a hardness less than or substantially equal to 30 HRC; and
   a bearing assembly including a plurality of rollers, the bearing assembly being positioned about the shaft with the plurality of rollers in rolling contact with the outer contact surface of the shaft and substantially zero clearance between the rollers and the shaft,
   wherein each roller includes a roller contact surface that bears against the outer contact surface of the shaft, the roller contact surfaces having a hardness less than or substantially equal to 45 HRC.

2. The steering column of claim 1 wherein the hardness of the roller contact surface is less than or substantially equal to 25 HRC.

3. The steering column of claim 1 wherein the hardness of the roller contact surface is less than or substantially equal to 100 HRB.

4. The steering column of claim 1 wherein the hardness of the outer contact surface of the shaft is between about 85 HRB and about 95 HRB.

5. The steering column of claim 4 wherein the hardness of the roller contact surface is less than or substantially equal to 25 HRC.

6. The steering column of claim 4 wherein the hardness of the roller contact surface is between about 85 HRB and about 95 HRB.

7. The steering column of claim 1 wherein the plurality of rollers comprises a plurality of load bearing rollers and a plurality of non-load bearing rollers, the load bearing rollers having a roller contact surface with a hardness less than or substantially equal to 45 HRC.

8. The steering column of claim 1 wherein the plurality of rollers are formed from hardened steel and the roller contact surfaces are tempered such that the hardness of the roller contact surfaces is less than or substantially equal to 45 HRC.

9. A steering column comprising:
   a shaft including an outer contact surface, the outer contact surface having a hardness less than or substantially equal to 30 HRC; and
   a bearing assembly including a plurality of rollers, the bearing assembly being positioned about the shaft with the plurality of rollers in rolling contact with the outer contact surface of the shaft and substantially zero clearance between the rollers and the shaft,
   wherein each roller includes a roller contact surface that bears against the outer contact surface of the shaft, and
   further wherein a ratio of a hardness of the roller contact surface to the hardness of the outer contact surface is less than or substantially equal to 4.5.

10. The steering column of claim 9 wherein the hardness of the outer contact surface of the shaft is about 10 HRC.

11. The steering column of claim 10 wherein the ratio of the hardness of the roller contact surface to the outer contact surface of the shaft is less than 2.5.

12. The steering column of claim 10 wherein the ratio of the hardness of the roller contact surface to the outer contact surface of the shaft is about 1.

13. The steering column of claim 9 wherein the ratio of the hardness of the roller contact surface to the outer contact surface of the shaft is about 1.

14. The steering column of claim 9 wherein the ratio of the hardness of the roller contact surface to the outer contact surface of the shaft is less than 1.

15. The steering column of claim 9 wherein the hardness of the roller contact surface is less than or substantially equal to 45 HRC.

16. The steering column of claim 9 wherein the plurality of rollers comprises a plurality of load bearing rollers and a plurality of non-load bearing rollers, and the ratio of the hardness of the roller contact surface to the outer contact surface of the shaft is about 1.

17. The steering assembly of claim 9 wherein the plurality of rollers are formed from hardened steel and the roller contact surfaces are tempered such that the hardness of the roller contact surfaces is less than or substantially equal to 45 HRC.

18. A bearing assembly for positioning about a steering shaft, the shaft including an outer contact surface having a hardness less than or substantially equal to 30 HRC, the bearing assembly comprising:
   a plurality of rollers in rolling contact with the outer contact surface of the shaft such that there is substantially zero clearance between the rollers and the shaft, each roller including a roller contact surface that bears against the outer contact surface of the shaft, and wherein a ratio of a hardness of the roller contact surface to the hardness of the outer contact surface is less than or substantially equal to 4.5;
   an outer race member positioned about the plurality of rollers; and
   a bushing positioned between the plurality of rollers and the outer race member such that the bushing assists in creating the substantially zero clearance between the rollers and the shaft.

19. The bearing assembly of claim 18 wherein the hardness of the roller contact surfaces is less than or substantially equal to 45 HRC.

20. The bearing assembly of claim 18 wherein the ratio of the hardness of the roller contact surface to the outer contact surface of the shaft is about 1.

* * * * *